United States Patent
Ono et al.

(10) Patent No.: US 10,983,927 B2
(45) Date of Patent: Apr. 20, 2021

(54) ELECTRONIC DEVICE FOR RECOVERING FROM BUFFER OVERRUN IN A BUS SYSTEM

(71) Applicant: FUJI XEROX CO., LTD., Tokyo (JP)

(72) Inventors: Tomoyuki Ono, Kanagawa (JP);
Masaki Nudejima, Kanagawa (JP);
Takayuki Hashimoto, Kanagawa (JP);
Suguru Oue, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 185 days.

(21) Appl. No.: 16/020,091

(22) Filed: Jun. 27, 2018

(65) Prior Publication Data

US 2019/0018807 A1 Jan. 17, 2019

(30) Foreign Application Priority Data

Jul. 11, 2017 (JP) .............................. JP2017-135525

(51) Int. Cl.
*G06F 13/16* (2006.01)
*G06F 13/40* (2006.01)
*G06F 13/28* (2006.01)

(52) U.S. Cl.
CPC ...... *G06F 13/1668* (2013.01); *G06F 13/1605* (2013.01); *G06F 13/1642* (2013.01); *G06F 13/28* (2013.01); *G06F 13/4027* (2013.01)

(58) Field of Classification Search
CPC ............. G06F 13/1668; G06F 13/4027; G06F 12/0684; G06F 13/1642; G06F 13/28; G06F 13/1605
See application file for complete search history.

(56) References Cited

U.S. PATENT DOCUMENTS

| | | | | |
|---|---|---|---|---|
| 6,438,639 B1* | 8/2002 | Bakke | ................. | G06F 13/4221 710/300 |
| 7,058,080 B1* | 6/2006 | Yamada | ............. | H04Q 11/0478 370/466 |
| 7,149,828 B2* | 12/2006 | Hayashi | ................. | G06F 13/364 710/120 |
| 2004/0049710 A1* | 3/2004 | Ashmore | ............ | G06F 11/0784 714/6.11 |
| 2004/0078665 A1* | 4/2004 | Rojas | .................... | H04L 49/358 714/23 |
| 2007/0011389 A1* | 1/2007 | Nishikawa | ............ | G06F 13/362 710/309 |

(Continued)

FOREIGN PATENT DOCUMENTS

| | | |
|---|---|---|
| JP | 2006-309349 A | 11/2006 |
| JP | 2011-053895 A | 3/2011 |
| JP | 2016-015158 A | 1/2016 |

*Primary Examiner* — Tim T Vo
*Assistant Examiner* — Phong H Dang
(74) *Attorney, Agent, or Firm* — Oliff PLC

(57) ABSTRACT

An electronic device includes a memory, plural master circuits, a transmission path, a detection unit, and a reset control unit. The plural master circuits read and write data from and into the memory. Plural instructions and data are transmitted through the transmission path while buffering and arbitrating the instructions and the data. The detection unit detects a buffer overrun in the transmission path. The reset control unit performs reset control for a portion of the transmission path affected by the buffer overrun and master circuits, of the plural master circuits, affected by the buffer overrun.

6 Claims, 6 Drawing Sheets

(56) References Cited

U.S. PATENT DOCUMENTS

| 2008/0005405 | A1* | 1/2008 | Innis | G06F 5/12 |
| | | | | 710/56 |
| 2011/0182181 | A1* | 7/2011 | Kang | H04L 43/0876 |
| | | | | 370/231 |
| 2016/0077799 | A1* | 3/2016 | Matsui | G06F 5/14 |
| | | | | 714/56 |

* cited by examiner

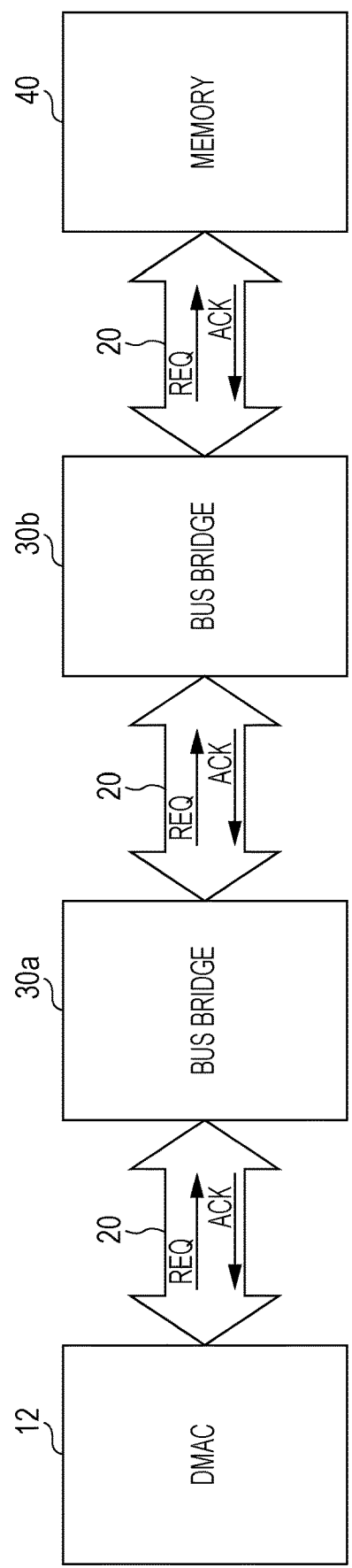

FIG. 3A

| MODULE | SIGNAL | INITIAL STATE | REQ GENERATED BY DMAC | REQ RECEIVED ON MASTER SIDE OF BB-a | ACK GENERATED ON MASTER SIDE OF BB-a | ACK RECEIVED BY DMAC | REQ GENERATED ON MEMORY SIDE OF BB-a | REQ RECEIVED ON MASTER SIDE OF BB-b | ACK GENERATED ON MASTER SIDE OF BB-b | ACK RECEIVED ON MEMORY SIDE OF BB-a | REQ GENERATED ON MEMORY SIDE OF BB-b | ACK RECEIVED ON MEMORY SIDE OF BB-b |
|---|---|---|---|---|---|---|---|---|---|---|---|---|
| DMAC | REQ | 0 | 1 | 1 | 1 | 1 | 1 | 1 | 1 | 1 | 1 | 1 |
| DMAC | ACK | 0 | 0 | 0 | 0 | 1 | 1 | 1 | 1 | 1 | 1 | 1 |
| BUS BRIDGE 30a (BB-a) | REQ (MASTER SIDE) | 0 | 0 | 1 | 1 | 1 | 1 | 1 | 1 | 1 | 1 | 1 |
| BUS BRIDGE 30a (BB-a) | ACK (MASTER SIDE) | 0 | 0 | 0 | 1 | 1 | 1 | 1 | 1 | 1 | 1 | 1 |
| BUS BRIDGE 30a (BB-a) | REQ (MEMORY SIDE) | 0 | 0 | 0 | 0 | 0 | 1 | 1 | 1 | 1 | 1 | 1 |
| BUS BRIDGE 30a (BB-a) | ACK (MEMORY SIDE) | 0 | 0 | 0 | 0 | 0 | 0 | 0 | 0 | 1 | 1 | 1 |
| BUS BRIDGE 30b (BB-b) | REQ (MASTER SIDE) | 0 | 0 | 0 | 0 | 0 | 0 | 1 | 1 | 1 | 1 | 1 |
| BUS BRIDGE 30b (BB-b) | ACK (MASTER SIDE) | 0 | 0 | 0 | 0 | 0 | 0 | 0 | 1 | 1 | 1 | 1 |
| BUS BRIDGE 30b (BB-b) | REQ (MEMORY SIDE) | 0 | 0 | 0 | 0 | 0 | 0 | 0 | 0 | 0 | 1 | 1 |
| BUS BRIDGE 30b (BB-b) | ACK (MEMORY SIDE) | 0 | 0 | 0 | 0 | 0 | 0 | 0 | 0 | 0 | 0 | 1 |

FIG. 3B

| MODULE | SIGNAL | INITIAL STATE | REQ GENERATED BY DMAC | REQ RECEIVED ON MASTER SIDE OF BB-a | ACK GENERATED ON MASTER SIDE OF BB-a | ACK RECEIVED BY DMAC | REQ GENERATED ON MEMORY SIDE OF BB-a | REQ RECEIVED ON MASTER SIDE OF BB-b | ACK GENERATED ON MASTER SIDE OF BB-b | ACK RECEIVED ON MEMORY SIDE OF BB-a | REQ GENERATED ON MEMORY SIDE OF BB-b | ACK RECEIVED ON MEMORY SIDE OF BB-b |
|---|---|---|---|---|---|---|---|---|---|---|---|---|
| DMAC | REQ | 0 | 1 | 1 | 1 | 1 | 1 | 1 | 1 | 1 | 1 | 1 |
| DMAC | ACK | 0 | 0 | 0 | 0 | 1 | 1 | 1 | 1 | 1 | 1 | 1 |
| BUS BRIDGE 30a (BB-a) | REQ (MASTER SIDE) | 0 | 0 | 1 | 1 | 1 | 1 | 1 | 1 | 1 | 1 | 1 |
| BUS BRIDGE 30a (BB-a) | ACK (MASTER SIDE) | 0 | 0 | 0 | 1 | 1 | 1 | 1 | 1 | 1 | 1 | 1 |
| BUS BRIDGE 30a (BB-a) | REQ (MEMORY SIDE) | 0 | 0 | 0 | 0 | 0 | 1 | 1 | 1 | 1 | 1 | 1 |
| BUS BRIDGE 30a (BB-a) | ACK (MEMORY SIDE) | 0 | 0 | 0 | 0 | 0 | 0 | 0 | 0 | 1 | 1 | 1 |
| BUS BRIDGE 30b (BB-b) | REQ (MASTER SIDE) | 0 | 0 | 0 | 0 | 0 | 0 | 1 | 1 | 1 | 1 | 1 |
| BUS BRIDGE 30b (BB-b) | ACK (MASTER SIDE) | 0 | 0 | 0 | 0 | 0 | 0 | 0 | 1 | 1 | 1 | 1 |
| BUS BRIDGE 30b (BB-b) | REQ (MEMORY SIDE) | 0 | 0 | 0 | 0 | 0 | 0 | 0 | 0 | 0 | *0* | 0 |
| BUS BRIDGE 30b (BB-b) | ACK (MEMORY SIDE) | 0 | 0 | 0 | 0 | 0 | 0 | 0 | 0 | 0 | 0 | 0 |

ELECTRONIC DEVICE FOR RECOVERING FROM BUFFER OVERRUN IN A BUS SYSTEM

CROSS-REFERENCE TO RELATED APPLICATIONS

This application is based on and claims priority under 35 USC 119 from Japanese Patent Application No. 2017-135525 filed Jul. 11, 2017.

BACKGROUND

(i) Technical Field

The present invention relates to an electronic device.

(ii) Related Art

In electronic devices, a variety of electronic components such as a processor that serves as a computation unit and a memory are connected to each other via buses. In a bus system, data being transferred are occasionally lost because of an increase in load, occurrence of a trouble, or the like. In this case, the bus system is reset for recovery.

A split transaction is performed to improve the use efficiency of the buses. In the split transaction, when a certain device starts a data transfer process, the process is suspended while the device is waiting for an acknowledgment to allow another device to perform a data transfer process. The use efficiency of the buses may be improved by preventing one device from occupying the buses for a long time.

SUMMARY

According to an aspect of the present invention, there is provided an electronic device including: a memory; plural master circuits that read and write data from and into the memory; a transmission path through which plural instructions and data are transmitted while buffering and arbitrating the instructions and the data; a detection unit that detects a buffer overrun in the transmission path; and a reset control unit that performs reset control for a portion of the transmission path affected by the buffer overrun and master circuits, of the plural master circuits, affected by the buffer overrun.

BRIEF DESCRIPTION OF THE DRAWINGS

Exemplary embodiments of the present invention will be described in detail based on the following figures, wherein:

FIG. 2 illustrates a method of detecting a buffer overflow in the bus system;

FIGS. 3A and 3B each illustrate how a request (REQ) and an acknowledgment (ACK) are transmitted in the bus system illustrated in FIG. 2, in which FIG. 3A illustrates an example of operation to transmit a request (REQ) from a DMAC to a memory via bus bridges during normal times, and FIG. 3B illustrates an example of operation during occurrence of an abnormality;

DETAILED DESCRIPTION

Exemplary embodiments of the present invention will be described in detail below with reference to the accompanying drawings.

<Example of Configuration of Electronic Device According to Present Exemplary Embodiment>

Examples of a split bus as an on-chip bus for use in an integrated circuit formed on a chip such as a system on a chip (SoC) include an advanced extensible interface (AXI) bus and an open core protocol (OCP) bus. In the description of a present exemplary embodiment, the AXI bus is used. However, the present invention may also be applied to other split buses.

Figure 1:
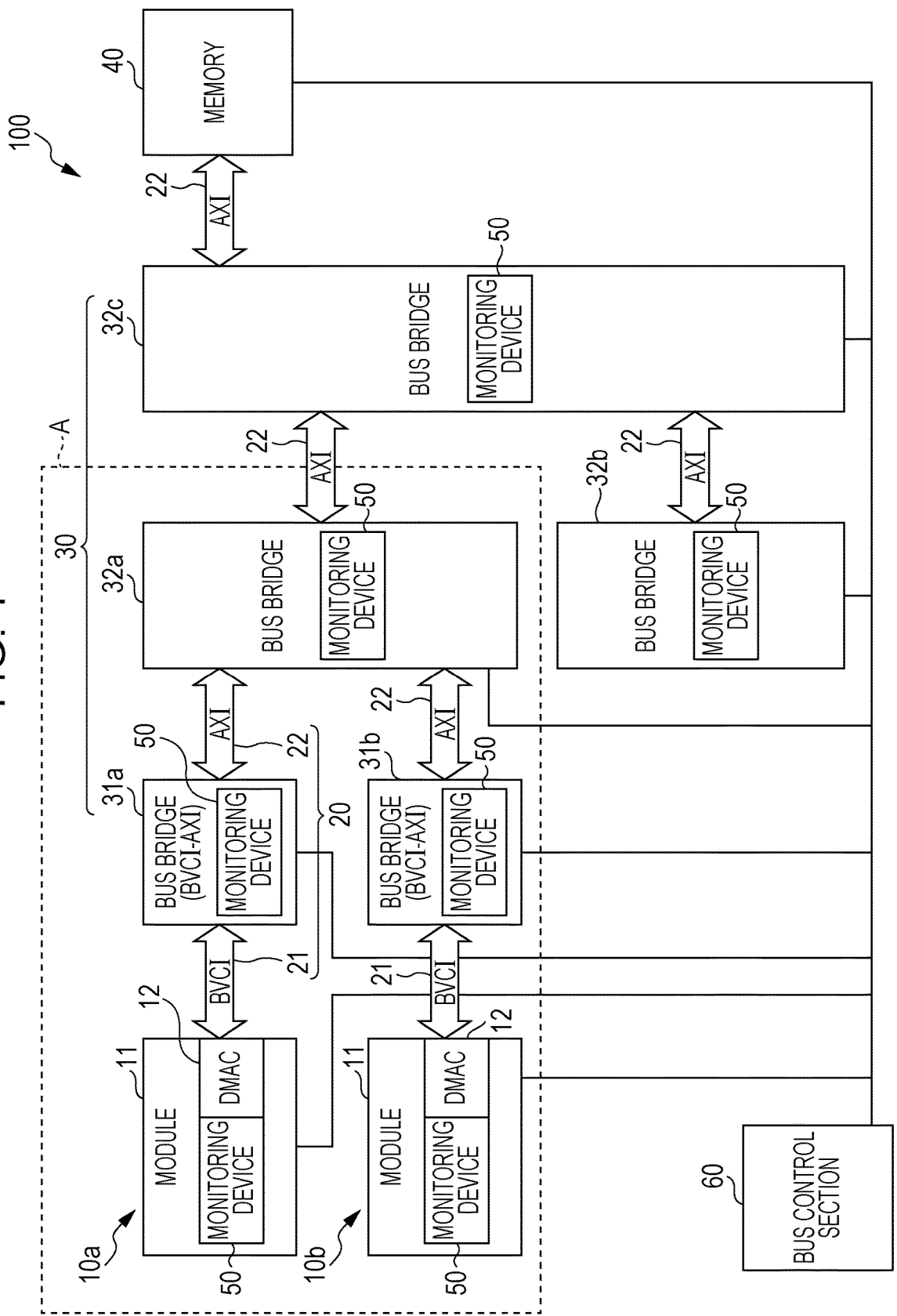
FIG. 1 illustrates an example of the configuration of a bus system according to a present exemplary embodiment.

FIG. 1 illustrates an example of the configuration of a bus system according to a present exemplary embodiment. In a bus system 100 according to the present exemplary embodiment illustrated in FIG. 1, a memory 40 is accessed from plural direct memory access (DMA) masters 10 by way of plural buses 20 and bus bridges 30. A random access memory (RAM) (such as a double-data-rate synchronous dynamic random access memory (DDR-SDRAM), for example) and a RAM controller (such as a DDR-SDRAM memory controller+PHY, for example) are used as the memory 40. In FIG. 1, the buses 20 include basic virtual component interface (BVCI) buses 21 and AXI buses 22. The bus bridges 30 include bus bridges 31 that relay between the BVCI bus 21 and the AXI bus 22 and bus bridges 32 that relay between the AXI buses 22. The DMA masters 10 and the bus bridges 30 are each provided with a monitoring device 50 that monitors the state of data transfer. Each monitoring device 50 is connected to a bus control section 60 that controls operation of the bus system 100. In FIG. 1, the DMA masters 10 and the bus bridges 31 and 32 are provided with an index (such as a and b). In the case where the individual constituent elements are not differentiated from each other, however, the constituent elements are not provided with an index as described above. A central processing unit (CPU) that configures the DMA masters 10 (suspends or resumes DMA) in the bus system 100 illustrated in FIG. 1 is provided, although not specifically illustrated.

The DMA master 10 is a master circuit that reads and writes data from and into the memory 40 through DMA. In the example illustrated in FIG. 1, the DMA master 10 includes a module 11 that performs various types of operation (such as data processing and control), a DMAC 12 for access to the memory 40 through DMA, and a monitoring device 50. The monitoring device 50 which is provided in the DMA master 10 monitors data transfer (DMA transfer) in the DMA master 10, and counts requests (REQs) issued (transmitted) by the DMA master 10 and acknowledgments (ACKs) received by the DMA master 10. In FIG. 1, some of the DMA masters 10 are not illustrated, and two DMA masters 10a and 10b are illustrated.

The bus 20 is used to transmit data (instructions and data to be read and written) between the DMA master 10 and the memory 40. The bus bridge 30 connects between the buses 20. In the example illustrated in FIG. 1, as discussed above, the BVCI bus 21 and the AXI bus 22 are used as the bus 20. The DMA master 10a, for example, is connected to the memory 40 via the BVCI bus 21, the bus bridge 31a, the AXI bus 22, the bus bridge 32a, the AXI bus 22, the bus bridge 32c, and the AXI bus 22.

The bus bridge 30 connects between different buses, and arbitrates data transfer between the connected buses. In the example illustrated in FIG. 1, the bus bridges 30 includes the bus bridges 31 which connect between the BVCI bus 21 and the AXI bus 22, and the bus bridges 32 which connect between the AXI buses 22. The bus bridges 31 and 32 each include the monitoring device 50. The monitoring device 50 which is provided in the bus bridge 31, 32 monitors data transfer in the bus bridge 31, 32, and counts requests (REQs) and acknowledgments (ACKs) transmitted and received. In FIG. 1, components on the DMA master 10 side with respect to the bus bridge 32b are not illustrated.

The configuration of connection between the buses 20 and the bus bridges 30 in the bus system 100 according to the present exemplary embodiment is not limited to the example illustrated in FIG. 1. In the example illustrated in FIG. 1, for example, transmission paths from the DMA masters 10a and 10b to the memory 40 each include four buses 20 and three bus bridges 30. However, the transmission paths may each include different numbers of buses 20 and bus bridges 30. The BVCI bus 21 is connected to the DMA master 10 as the bus 20. However, the AXI bus 22 may be connected to the DMA master 10 as the bus 20. In the bus system 100 for DMA with plural DMA masters 10, in general, as the distance from the memory 40 to be accessed is shorter, the transmission paths are more integrated and aggregated, and therefore buses 20 with a higher transmission efficiency are used. On the contrary, buses 20 with a higher transmission efficiency do not need to be used at positions closer to the DMA masters 10 compared to positions closer to the memory 40. In the example illustrated in FIG. 1, the BVCI buses 21 with a lower transmission efficiency than that of the AXI buses 22 are used only as the buses 20 which are connected to the DMA masters 10, by way of example.

As discussed above, the monitoring device 50 is provided in each of the DMA masters 10 and the bus bridges 30, and monitors data transfer in the bus system 100. In FIG. 1, one monitoring device 50 is provided in each of the bus bridges 30. However, the monitoring device 50 monitors data transfer for each of the buses 20. For example, the monitoring device 50 in the bus bridge 32a illustrated in FIG. 1 monitors data transfer for each of the three AXI buses 22 for connection with the bus bridges 31a and 31b on the DMA master 10 side and the bus bridge 32c on the memory 40 side. In many cases, the bus system 100 is provided with a bus arbiter that arbitrates data transfer in the entire bus system 100, although not specifically illustrated. In such cases, the bus arbiter is also provided with the monitoring device 50, and the monitoring device 50 monitors data transfer arbitrated by the bus arbiter.

The bus control section 60 acquires monitoring information (count of transferred data (requests and acknowledgments)) on data transfer from the monitoring device 50, and determines on the basis of the acquired count whether or not data related to the requests and acknowledgments have been lost at any location in the bus system 100. The bus control section 60 is an example of a reset control unit (circuit) that performs reset control, in the case where a loss of data is detected, for the DMA masters 10 and the bus bridges 30 which are involved in the detected loss of data.

In the bus system 100, data such as requests issued by the plural DMA masters 10 are transmitted to the memory 40 while performing arbitration, and therefore a buffer is provided to temporarily hold the data in the bus system 100. If data in an amount that exceeds the capacity of the prepared buffer are transmitted, however, a buffer overflow (data overrun) is caused, and the data may be lost. Split buses such as the AXI bus 22 perform complicated arbitration in order to transmit a second request without waiting for an acknowledgment to a first request or transmit a reading request and a writing request at the same time. Therefore, the split buses have a higher risk of occurrence of a buffer overflow than buses that do not support a split transaction. Thus, in the present exemplary embodiment, the bus control section 60 detects occurrence of a buffer overflow on the basis of monitoring information acquired by the monitoring device 50, specifies the location at which the buffer overflow has occurred, and performs reset control for recovering the bus system 100. Thus, the monitoring devices 50 and the bus control section 60 function as a detection unit that detects a buffer overrun in the bus system 100 which serves as a transmission path.

<Detection of Buffer Overflow>

The bus control section 60 detects a buffer overflow as follows. The bus control section 60 compares, for each of the buses 20, the number of requests and the number of acknowledgments transmitted via the bus 20 on the basis of monitoring information from the monitoring devices 50 of the DMA masters 10 and the bus bridges 30. The bus control section 60 also compares the number of data transmitted via the bus 20 on the transmission side and the number of data transmitted via the bus 20 on the reception side. The bus control section 60 also compares the number of data received at each of the bus bridges 30 and the number of data transmitted at each of the bus bridges 30. The bus control section 60 specifies a location at which a buffer overflow has occurred in the bus system 100 on the basis of the results of the comparisons. That is, the bus control section 60 determines that a buffer overflow has occurred in the case where the number of data directed from the DMA master 10 side toward the memory 40 side and the number of data directed from the memory 40 side toward the DMA master 10 side do not match each other.

A specific example will be described further. Focus is placed on the AXI bus 22 between the bus bridge 31a and the bus bridge 32a, by way of example. The AXI bus 22 is a part of a transmission path for transmission of an instruction issued by the DMA master 10a to the memory 40. In this example, the bus control section 60 calculates the difference between the number of requests transmitted by the bus bridge 31a and the number of acknowledgments received by the bus bridge 31a. If the number of acknowledgments is smaller than the number of requests, the bus control section 60 determines that a buffer overflow has occurred on the memory 40 side with respect to the bus bridge 31a, and that a request or an acknowledgment is lost.

The bus control section 60 also calculates the difference between the number of requests received by the bus bridge 32a and the number of acknowledgments transmitted by the bus bridge 32a. If the number of acknowledgments is smaller than the number of requests, the bus control section 60 determines that a buffer overflow has occurred on the memory 40 side with respect to the bus bridge 32a, and that a request or an acknowledgment is lost.

The bus control section 60 also calculates the difference between the number of requests transmitted by the bus bridge 31a and the number of requests received by the bus bridge 32a, and the difference between the number of acknowledgments transmitted by the bus bridge 32a and the number of acknowledgments received by the bus bridge 31a. If the number of requests received by the bus bridge 32a is smaller than the number of requests transmitted by the bus bridge 31a, the bus control section 60 determines that a request is lost during transmission through the AXI bus 22 between the bus bridge 31a and the bus bridge 32a. Similarly, if the number of acknowledgments received by the bus bridge 31a is smaller than the number of acknowledgments transmitted by the bus bridge 32a, the bus control section 60 determines that an acknowledgment is lost during transmission through the AXI bus 22 between the bus bridge 31a and the bus bridge 32a.

The bus control section 60 also calculates the difference between the number of requests received from the DMA master 10 side and the number of requests transmitted to the memory 40 side at each of the bus bridges 30. Similarly, the bus control section 60 calculates the difference between the number of acknowledgments received from the memory 40 side and the number of acknowledgments transmitted to the DMA master 10 side. If the number of transmitted requests is smaller than the number of received requests, the bus control section 60 determines that a buffer overflow has occurred in the bus bridge 30, and that a request is lost. If the number of transmitted acknowledgments is smaller than the number of received acknowledgments, the bus control section 60 determines that a buffer overflow has occurred in the bus bridge 30, and that an acknowledgment is lost.

The detection of a buffer overflow will be further described using a simple model. FIG. 2 illustrates a method of detecting a buffer overflow in the bus system 100. In the example illustrated in FIG. 2, the bus system 100 is represented by a simple model that includes a DMAC 12 (DMA master 10), a bus bridge 30a, a bus bridge 30b, a memory 40, and buses 20.

FIGS. 3A and 3B are each a table illustrating how a request (REQ) and an acknowledgment (ACK) are transferred in the bus system 100 illustrated in FIG. 2. FIG. 3A illustrates an example of operation to transmit a request (REQ) from the DMAC 12 to the memory 40 via the bus bridges 30a and 30b during normal times. FIG. 3B illustrates an example of operation during occurrence of an abnormality. In FIGS. 3A and 3B, the bus bridge 30a which is the first from the DMAC 12 and the bus bridge 30b which is the second from the DMAC 12 are abbreviated, as appropriate, as "BB-a" and "BB-b", respectively. In the example illustrated in FIGS. 3A and 3B, variations in state of request (REQ) and acknowledgment (ACK) signals monitored by the monitoring device 50 at the respective constituent elements, namely the DMAC 12, the bus bridge 30a, and the bus bridge 30b, are indicated. In FIGS. 3A and 3B, each of the signals has a value "0" in the initial state, and is varied to a value "1" at the time (position with a thick box) when operation related to the signal (generation or reception (indicated as "reception" in the drawings) of the signal) is caused.

An example of operation during normal times will be described with reference to FIG. 3A. First, the DMAC 12 issues a request (REQ), which is sent to the bus bridge 30a via the bus 20. In FIG. 3A, the signal "REQ" of the DMAC 12 has a value "1" since the article "REQ generated by DMAC". The generated request (REQ) is transmitted through the bus 20, and received by a master-side terminal (terminal on the DMA master 10 side) of the bus bridge 30a. In FIG. 3A, the signal "REQ" on the master side of the bus bridge 30a (BB-a) has a value "1" since the article "REQ received on master side of BB-a". Upon receiving the signal, the bus bridge 30a returns an acknowledgment (ACK) to the DMAC 12 which transmitted the signal. In FIG. 3A, the signal "ACK" on the master side of the bus bridge 30a has a value "1" since the article "ACK generated on master side of BB-a". In addition, the signal "ACK" of the DMAC 12 has a value "1" since the article "ACK received by DMAC".

Next, the bus bridge 30a sends the received request (REQ) from a terminal on the memory 40 side to the bus bridge 30b via the bus 20. In FIG. 3A, the signal "REQ" on the memory side of the bus bridge 30a (BB-a) has a value "1" since the article "REQ generated on memory side of BB-a". The request (REQ) which is sent from the bus bridge 30a is transmitted through the bus 20, and received by a master-side terminal of the bus bridge 30b. In FIG. 3A, the signal "REQ" on the master side of the bus bridge 30b (BB-b) has a value "1" since the article "REQ received on master side of BB-b". Upon receiving the signal, the bus bridge 30b returns an acknowledgment (ACK) to the bus bridge 30a which transmitted the signal. In FIG. 3A, the signal "ACK" on the master side of the bus bridge 30b has a value "1" since the article "ACK generated on master side of BB-b". In addition, the signal "ACK" on the memory side of the bus bridge 30a has a value "1" since the article "ACK received on memory side of BB-a".

Next, the bus bridge 30b sends the received request (REQ) from a terminal on the memory 40 side to the memory 40 via the bus 20. In FIG. 3A, the signal "REQ" on the memory side of the bus bridge 30b (BB-b) has a value "1" since the article "REQ generated on memory side of BB-b". When the request (REQ) reaches the memory 40, an acknowledgment (ACK) is returned from the memory 40 to the bus bridge 30b. In FIG. 3A, the signal "ACK" on the memory side of the bus bridge 30b (BB-b) has a value "1" since the article "ACK received on memory side of BB-b". It is seen from the above that the request (REQ) which was issued by the DMAC 12 has reached the memory 40.

Next, an example of operation during occurrence of an abnormality will be described with reference to FIG. 3B. In the operation illustrated in FIG. 3B, a request (REQ) is issued by the DMAC 12 and transmitted toward the memory 40 as in the operation example illustrated in FIG. 3A, but a buffer overflow occurs in the bus bridge 30b. Operation until the request (REQ) which is issued by the DMAC 12 reaches the bus bridge 30b is the same as the operation discussed above with reference to FIG. 3A, and thus will not be described.

In FIG. 3B, upon receiving the request (REQ), the bus bridge 30b returns an acknowledgment (ACK) to the bus bridge 30a which transmitted the signal. In FIG. 3B, the signal "ACK" on the master side of the bus bridge 30b has a value "1" since the article "ACK generated on master side of BB-b". In addition, the signal "ACK" on the memory side of the bus bridge 30a has a value "1" since the article "ACK received on memory side of BB-a". Here, it is assumed that a buffer overflow has occurred at the bus bridge 30b. Therefore, a request (REQ) is not transmitted from the bus bridge 30b to the memory 40. In FIG. 3B, the signal "REQ" on the memory side of the bus bridge 30b (BB-b) continues to have a value "0" also in the article "REQ generated on memory side of BB-b" (thick box in the broken line in the drawing". Since a request (REQ) is not transmitted to the memory 40, an acknowledgment (ACK) is also not returned from the memory 40 to the bus bridge 30b. Thus, in FIG. 3B, the signal "ACK" on the memory side of the bus bridge 30b (BB-b) continues to have a value "0" also in the article "ACK received on memory side of BB-b".

Since the signal state is not varied in a portion of the transmission path after the terminal of the bus bridge 30b (BB-b) on the memory side as described above, it is seen that the signal "REQ" is lost because of the buffer overflow which has occurred in an internal buffer of the bus bridge 30*b*. In the bus system 100, the signals are transmitted while being arbitrated, and therefore there is a slight time difference since a signal is detected at a preceding monitoring position in the transmission path until the signal is detected at a following monitoring position. Thus, it is determined that a buffer overflow has occurred in the case where the signal state is not varied, after the time which is needed for arbitration has elapsed, for a monitoring position that follows the monitoring position at which variations in signal state are detected, for example.

In the AXI bus 22, as discussed above, requests (REQs) and acknowledgments (ACKs) are transferred via separate transmission paths (channels). In the AXI bus 22, in addition, a reading instruction (address) and reading data and a writing instruction (address) and writing data are transferred via separate transmission paths (channels) in response to a reading request and a writing request. Therefore, a buffer overflow may occur in each such transfer. In the entire bus system 100, as illustrated in FIG. 1, the transmission paths are aggregated from the DMA master 10 side toward the memory 40. Therefore, a buffer overflow tends to occur in transfer from the DMA master 10 side toward the memory 40. Specifically, a buffer overflow tends to be caused for a reading instruction, a writing instruction, writing data, etc. In data reading, in particular, many requests may be successively issued by the DMA masters 10. Therefore, a buffer overflow tends to occur in data reading compared to other types of transfer. In data writing, a writing request may not be issued unless all data to be written have been prepared, and therefore requests are rarely issued successively (there is often an interval from the issuance of one request to the issuance of the next request). Thus, a buffer overflow is less likely to occur in data writing than in data reading. With the monitoring device 50 and the bus control section 60 according to the present exemplary embodiment, however, occurrence of a buffer overflow may be detected, and the location of the occurrence of the buffer overflow may be specified, irrespective of the type of transfer.

<Reset Control>

Next, reset control by the bus control section 60 will be described. The bus control section 60 specifies, on the basis of the location of the occurrence of a buffer overflow specified as described above, a portion of the transmission path which forms the bus system 100 affected by the buffer overflow. The bus control section 60 performs reset control for recovering operation for the specified transmission path portion.

FIG. 1 is referenced again. It is assumed that a buffer overflow has occurred at the bus bridge 32*a* in the configuration example illustrated in FIG. 1. In this case, transmission path portions on the DMA master 10 side with respect to the bus bridge 32*a*, at which the buffer overflow has occurred, may be affected by the buffer overflow. That is, requests issued by or acknowledgments to be received by the DMA masters 10 which use the transmission path portions (the DMA masters 10*a* and 10*b* in the example illustrated in FIG. 1) may be lost. Thus, in the case where a buffer overflow has occurred at the bus bridge 32*a* in the configuration illustrated in FIG. 1, transmission path portions in a region A indicated by the broken line in FIG. 1 are affected by the buffer overflow. Reset control is performed for the DMACs 12 (DMA masters 10) and the bus bridges 30 which are included in the region A.

Figure 4:
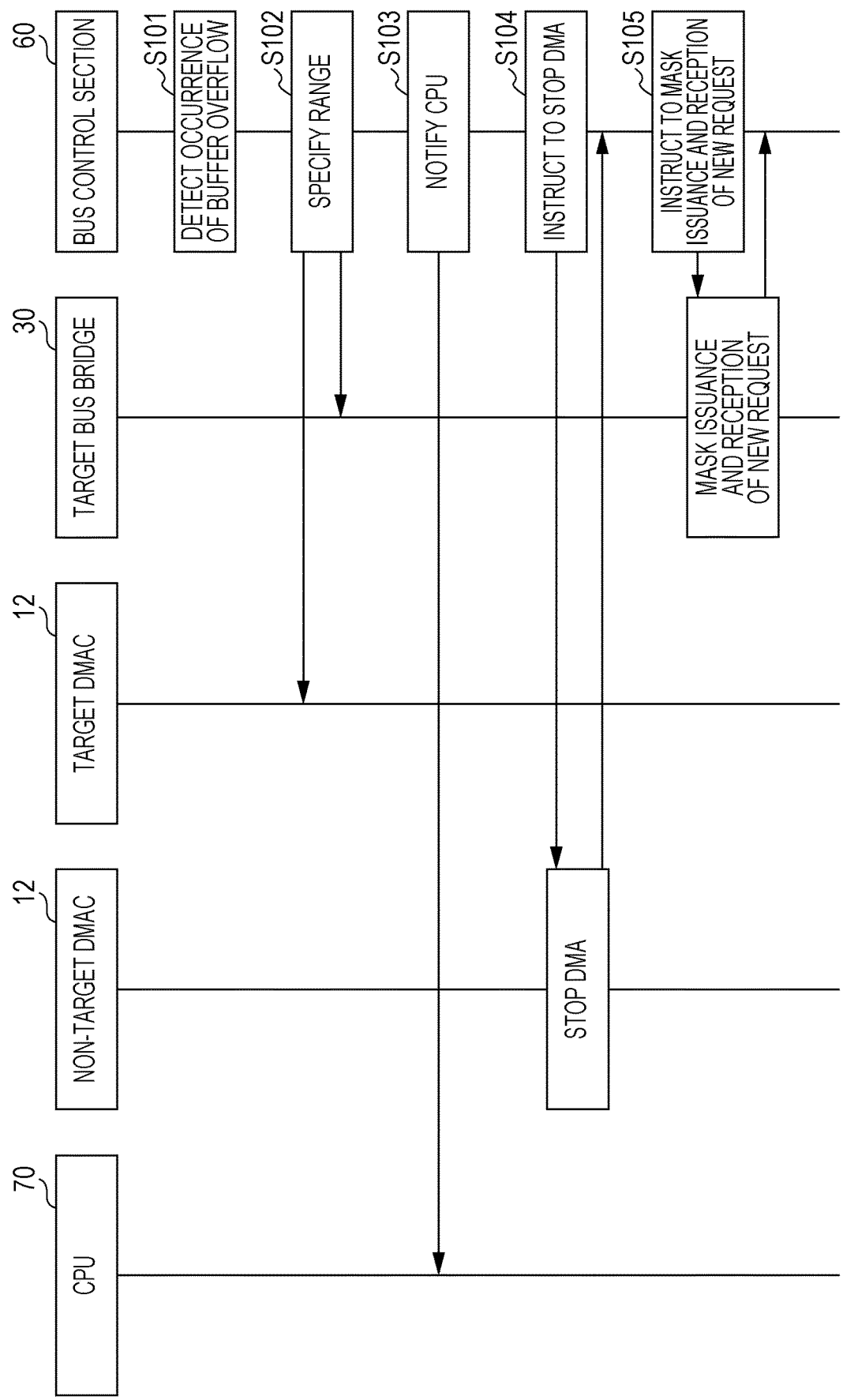
FIG. 4 is a sequence diagram illustrating operation prior to reset execution in operation for reset control by a bus control section.
Figure 5:
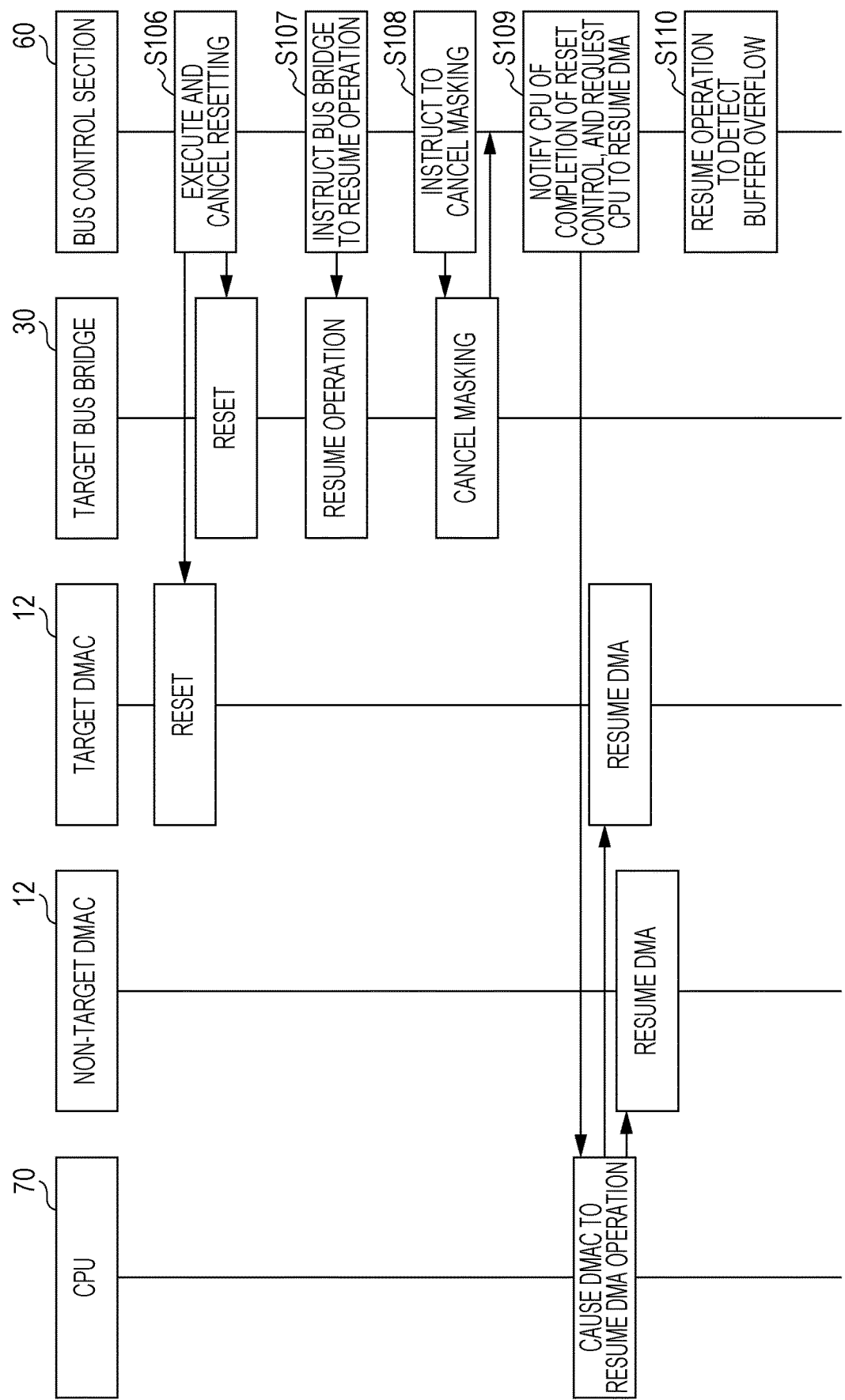
FIG. 5 is a sequence diagram illustrating operation subsequent to the reset execution in the operation for reset control by the bus control section.

FIGS. 4 and 5 are each a sequence diagram illustrating operation of reset control by the bus control section 60. FIG. 4 illustrates operation prior to reset execution. FIG. 5 illustrates operation subsequent to the reset execution. In FIGS. 4 and 5, a CPU 70 performs various types of data processing and control, and functions as a configuration unit that configures the DMA masters 10 in the bus system 100 (suspends or resumes DMA transfer). A non-target DMAC 12 is a DMAC 12 that is not subjected to reset control (positioned outside the region A in the example illustrated in FIG. 1). A target DMAC 12 is a DMAC 12 that is subjected to reset control (positioned inside the region A in the example illustrated in FIG. 1). A target bus bridge 30 is a bus bridge 30 that is subjected to reset control (positioned inside the region A in the example illustrated in FIG. 1).

As illustrated in FIG. 4, when occurrence of a buffer overflow is detected on the basis of monitoring information acquired from the monitoring device 50 (S101), the bus control section 60 specifies a range for performing reset control (S102). The bus control section 60 performs an interrupt process for the CPU 70 to notify the CPU 70 that a buffer overflow has occurred (S103). As discussed above, the range for performing reset control is a range affected by the buffer overflow which has occurred, and includes transmission path portions on the DMAC 12 (DMA master 10) side with respect to the location at which the buffer overflow has occurred. The CPU 70 is notified of the occurrence of the buffer overflow in order to perform operation control for the DMAC 12 which has been subjected to the reset control and the DMAC 12 which is not subjected to the reset control in the subsequent operation.

Next, the bus control section 60 instructs the non-target DMAC 12 to stop DMA transfer (S104). This is to avoid data transfer through DMA from the DMAC 12 which is not subjected to the reset control during the reset control. When DMA transfer by the non-target DMAC 12 which has received the instruction from the bus control section 60 is stopped, a notification that DMA transfer has been stopped is delivered from the non-target DMAC 12 to the bus control section 60.

The bus control section 60 instructs the target bus bridge 30 to mask issuance and reception of a new request (S105). Here, masking issuance corresponds to not transmitting a new request to the following bus bridge 30, and masking reception corresponds to not returning an acknowledgment even if a new request is received. When the target bus bridge 30 which has received the instruction from the bus control section 60 finishes masking issuance and reception of a new request, a notification that masking has been completed is delivered from the target bus bridge 30 to the bus control section 60.

Next, upon receiving the notification from the non-target DMAC 12 and the target bus bridge 30, the bus control section 60 resets the target DMAC 12 and the target bus bridge 30, and subsequently cancels resetting (S106 in FIG. 5). The bus control section 60 instructs the target bus bridge 30 to resume operation (S107), and further instructs the target bus bridge 30 to cancel masking of issuance and reception of a new request (S108). When the target bus bridge 30 which has received the instruction from the bus control section 60 cancels masking of issuance and reception of a new request, a notification that masking has been canceled is delivered from the target bus bridge 30 to the bus control section 60.

The bus control section 60 performs an interrupt process for the CPU 70 to notify the CPU 70 that the reset control has been finished, and request the CPU 70 to resume DMA transfer by the DMACs 12 (the target DMAC 12 and the non-target DMAC 12) (S109). The bus control section 60 resumes operation (analysis of monitoring information acquired from the monitoring device 50) for detecting a buffer overflow in preparation for DMA transfer to be resumed (S110). When the request is received from the bus control section 60, the CPU 70 resumes DMA transfer by the DMACs 12.

Other Embodiments

In the configuration example illustrated in FIG. 1, the monitoring device 50 which is provided in each of the DMA masters 10 and the bus bridges 30 acquires monitoring information that indicates the state of data transfer, and the bus control section 60 detects occurrence of a buffer overflow by analyzing the monitoring information, and specifies the location of the occurrence of the buffer overflow. On the contrary, a detection device that detects occurrence of a buffer overflow may be provided in each of the DMA masters 10 and the bus bridges 30.

Figure 6:
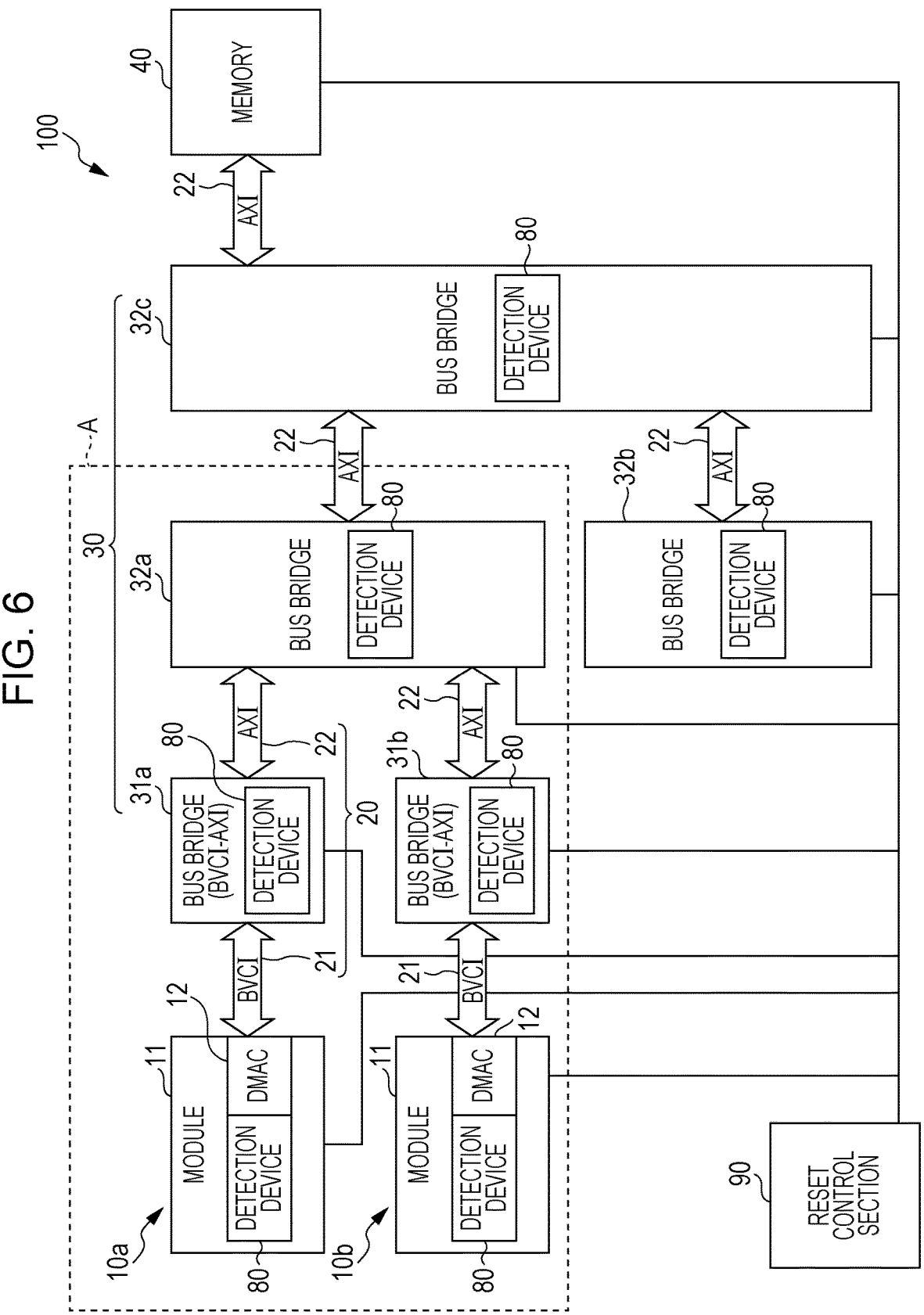
FIG. 6 illustrates an example of the configuration of a bus system according to another exemplary embodiment.

FIG. 6 illustrates an example of the configuration of a bus system according to another exemplary embodiment such as that described above. In the configuration example illustrated in FIG. 6, the DMA masters 10, the buses 20, the bus bridges 30, and the memory 40, and their connection relationship are the same as those in the configuration example illustrated in FIG. 1. In the exemplary embodiment illustrated in FIG. 6, a detection device 80 is provided in each of the bus bridges 30. The detection device 80 monitors the state of buffer or the state of data transfer of the bus bridge 30 in which the detection device 80 itself is provided, and detects a buffer overflow in the case where the buffer overflow has occurred.

In the configuration example illustrated in FIG. 6, each detection device 80 is connected to a reset control section 90. Upon detecting occurrence of a buffer overflow, the detection device 80 notifies the reset control section 90. Upon receiving a notification from the detection device 80, the reset control section 90 specifies a range affected by the buffer overflow which has occurred, and performs reset control for the DMA masters 10 and the bus bridges 30 in the specified range. Specifically, the DMA masters 10 and the bus bridges 30 in transmission path portions on the DMAC 12 (DMA master 10) side with respect to the bus bridge 30 in which the detection device 80 which has transmitted the notification of the detection of the buffer overflow is provided are subjected to reset control.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electronic device comprising:
   a memory;
   a plurality of master circuits that read and write data from and into the memory;
   a plurality of monitoring devices;
   a transmission path including a plurality of buses and a plurality of bus bridges through which a plurality of instructions and data are transmitted while buffering and arbitrating the instructions and the data, each of the plurality of master circuits and bus bridges including a monitoring device of the plurality of monitoring devices;
   a detection unit that: (i) detects a buffer overrun in the transmission path, the detection unit including each monitoring device of the master circuits and bus bridges, and each monitoring device being configured to acquire monitoring information regarding the buffer overrun; and (ii) based on the monitoring information acquired by the monitoring device, specifies a location in the transmission path at which the buffer overrun has occurred; and
   a reset control unit that performs reset control for a portion of the transmission path affected by the buffer overrun and master circuits, of the plurality of master circuits, affected by the buffer overrun,
   wherein the portion of the transmission path is at the specified location in the transmission path based on the monitoring information acquired by the monitoring device.

2. The electronic device according to claim 1,
   wherein the detection unit determines that the buffer overrun has occurred in a case where a number of data directed from a master circuit side toward a memory side and a number of data directed from the memory side toward the master circuit side do not match each other at a specific location in the transmission path.

3. The electronic device according to claim 2,
   wherein the detection unit determines whether or not the numbers match each other by counting the number of data directed from the master circuit side toward the memory side and the number of data directed from the memory side toward the master circuit side for each bus at least at a bus bridge provided on the transmission path.

4. The electronic device according to claim 1,
   wherein the reset control unit resets transmission path portions and master circuits positioned on a master circuit side with respect to a location at which the buffer overrun is detected by the detection unit, and does not reset the other transmission path portions and the other master circuits.

5. The electronic device according to claim 4,
   wherein the reset control unit resets the transmission path portions and the master circuits to be reset after stopping operation of the other transmission path portions and the other master circuits which are not to be reset.

6. An electronic device comprising:
   a memory;
   a plurality of master circuits that read and write data from and into the memory;
   a plurality of monitoring devices;
   a transmission path including a plurality of buses and a plurality of bus bridges through which a plurality of instructions and data are transmitted while buffering and arbitrating the instructions and the data, each of the plurality of master circuits and bus bridges including a monitoring device of the plurality of monitoring devices;
   detection means that: (i) detects a buffer overrun in the transmission path, the detection means including each monitoring device of the master circuits and bus bridges, and each monitoring device being configured to acquire monitoring information regarding the buffer overrun; and (ii) based on the monitoring information acquired by the monitoring device, specifies a location in the transmission path at which the buffer overrun has occurred; and reset control means that performs reset control for a portion of the transmission path affected by the buffer overrun and master circuits, of the plurality of master circuits, affected by the buffer overrun, wherein the portion of the transmission path is at the specified location in the transmission path based on the monitoring information acquired by the monitoring device.

\* \* \* \* \*